(12) United States Patent
Berridge et al.

(10) Patent No.: US 11,953,748 B2
(45) Date of Patent: Apr. 9, 2024

(54) FIBER OPTIC CASSETTE

(71) Applicant: Panduit Corp., Tinley Park, IL (US)

(72) Inventors: Benjamin J. Berridge, Griffith, IN (US); Joseph E. Sanders, Elwood, IL (US)

(73) Assignee: Panduit Corp., Tinley Park, IL (US)

( * ) Notice: Subject to any disclaimer, the term of this patent is extended or adjusted under 35 U.S.C. 154(b) by 35 days.

(21) Appl. No.: 17/341,783

(22) Filed: Jun. 8, 2021

(65) Prior Publication Data

US 2021/0294057 A1    Sep. 23, 2021

Related U.S. Application Data

(63) Continuation of application No. 16/669,623, filed on Oct. 31, 2019, now Pat. No. 11,048,055.

(60) Provisional application No. 62/768,225, filed on Nov. 16, 2018.

(51) Int. Cl.
*G02B 6/44* (2006.01)

(52) U.S. Cl.
CPC .................. *G02B 6/4453* (2013.01)

(58) Field of Classification Search
CPC .................................................. G02B 6/4453
See application file for complete search history.

(56) References Cited

U.S. PATENT DOCUMENTS

| | | |
|---|---|---|
| 5,917,984 A | 6/1999 | Roseler et al. |
| 7,961,999 B2 | 6/2011 | Fröhlich et al. |
| 8,189,983 B2 | 5/2012 | Brunet et al. |
| 8,606,068 B2 | 12/2013 | Lee |
| 8,660,397 B2 | 2/2014 | Giraud et al. |
| 8,913,868 B2 | 12/2014 | Hangebrauck |
| 9,291,788 B2 | 3/2016 | Rudenick et al. |
| 9,383,538 B2 | 7/2016 | Giraud et al. |
| 9,488,788 B2 | 11/2016 | Murray et al. |
| 9,575,275 B2 | 2/2017 | Blackwell, Jr. et al. |
| 9,678,259 B2 | 6/2017 | Matsuno et al. |
| 9,720,199 B2 | 8/2017 | Mead |
| 10,031,304 B2 | 7/2018 | Hill et al. |
| 10,048,460 B2 | 8/2018 | Courchaine et al. |
| 2009/0129033 A1 | 5/2009 | Smrha et al. |
| 2011/0274402 A1 | 11/2011 | Giraud et al. |
| 2014/0037259 A1 | 2/2014 | Bragg |
| 2014/0348480 A1 | 11/2014 | Giraud et al. |
| 2015/0316738 A1 | 11/2015 | McPhil Giraud et al. |
| 2016/0077298 A1 | 3/2016 | Wiltjer et al. |

(Continued)

FOREIGN PATENT DOCUMENTS

WO    2017021116 A1    2/2017

*Primary Examiner* — Sung H Pak
*Assistant Examiner* — Hoang Q Tran
(74) *Attorney, Agent, or Firm* — Christopher S. Clancy; James H. Williams; Peter S. Lee

(57) ABSTRACT

A cassette configured for the installation in a fiber enclosure system. The cassette includes a base, a first wall including a first front post, a second wall including a second front post, and a front wall with an opening including an adapter configured to connect to at least one fiber optic cable. The cassette further includes a latch located on the first wall configured to releasably connect the cassette to the fiber enclosure system, where a cassette lock is configured to retract the latch when the lock is actuated away from a rear of the cassette and deploy the latch when the lock is actuated toward the rear of the cassette.

18 Claims, 10 Drawing Sheets

(56) References Cited

U.S. PATENT DOCUMENTS

| | | |
|---|---|---|
| 2016/0216471 A1 | 7/2016 | Giraud et al. |
| 2017/0131500 A1* | 5/2017 | Sauter .................. G02B 6/4452 |
| 2019/0004268 A1* | 1/2019 | Vogel .................. G02B 6/4452 |

* cited by examiner

FIBER OPTIC CASSETTE

CROSS REFERENCE TO RELATED APPLICATIONS

This application is a continuation of U.S. patent application Ser. No. 16/669,623, filed on Oct. 31, 2019, which claims benefit to U.S. Provisional Application No. 62/768,225, filed Nov. 16, 2018, the entirety of all of which are hereby incorporated by reference herein.

FIELD OF THE INVENTION

The present invention relates to a fiber optic cassette for installation in a fiber enclosure system.

BACKGROUND OF THE INVENTION

Optical fibers allow for transmission of communications over longer distances and at higher bandwidths than copper wire cables. Optical fibers are also advantageous for communication systems because signals suffer less loss than copper wire cables and are immune to electromagnetic interference. Optical fibers are therefore often used for high bandwidth, long distance applications.

As demand for high bandwidth increases, it is advantageous to use smaller and/or higher capacity adapters to minimize the amount of data center rack space needed per optical fiber port. Due to this, many users of data centers are transitioning to smaller Local Connector adapters ("LC adapters") or Multi-Fiber Push-on/Pull-off adapters ("MPO adapters"). As more capacity is sought, more space is used within a cassette to accommodate the increased fiber density. Utilizing space within the cassette is limited due to the attachment mechanisms housed within the cassette that allows for the cassette to be installed and removed from a fiber enclosure system.

SUMMARY OF THE INVENTION

The present invention provides a fiber optic module or cassette for use within a fiber enclosure system including a base, a first wall including a first front post, a second wall including a second front post, and a front wall with an opening including an adapter configured to connect to at least one fiber optic cable, a latch located on the first wall configured to releasably connect the cassette to a fiber enclosure system, and a cassette lock configured to retract the latch when the lock is actuated away from a rear of the cassette deploy the latch when the lock is actuated toward the rear of the cassette.

BRIEF DESCRIPTION OF THE DRAWINGS

Objects, features, and advantages of the present invention will become apparent upon reading the following description in conjunction with the drawing figures in which.

DETAILED DESCRIPTION

The disclosed cassette, also commonly known as a module, solves or improves upon one or more of the above noted and/or other problems and disadvantages with prior cassettes. The disclosed cassette provides for a new cassette locking system that enables an increased area within the cassette to achieve a higher fiber density. These and other objects, features, and advantages of the present disclosure will become apparent to those having ordinary skill in the art upon reading this disclosure.

Figure 1:
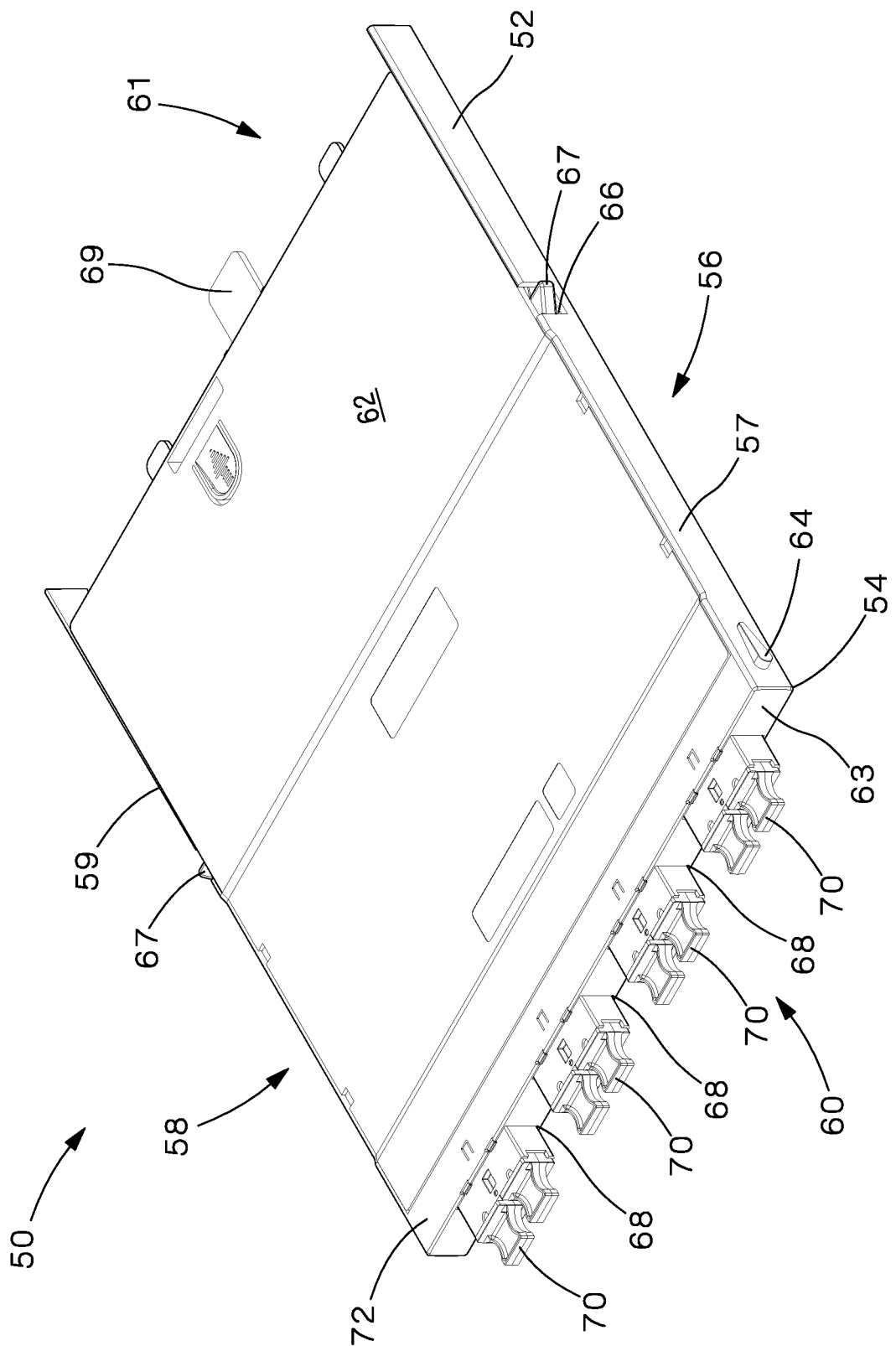
FIG. 1 depicts an isometric view of an example cassette of the present invention with the cover installed.
Figure 2:
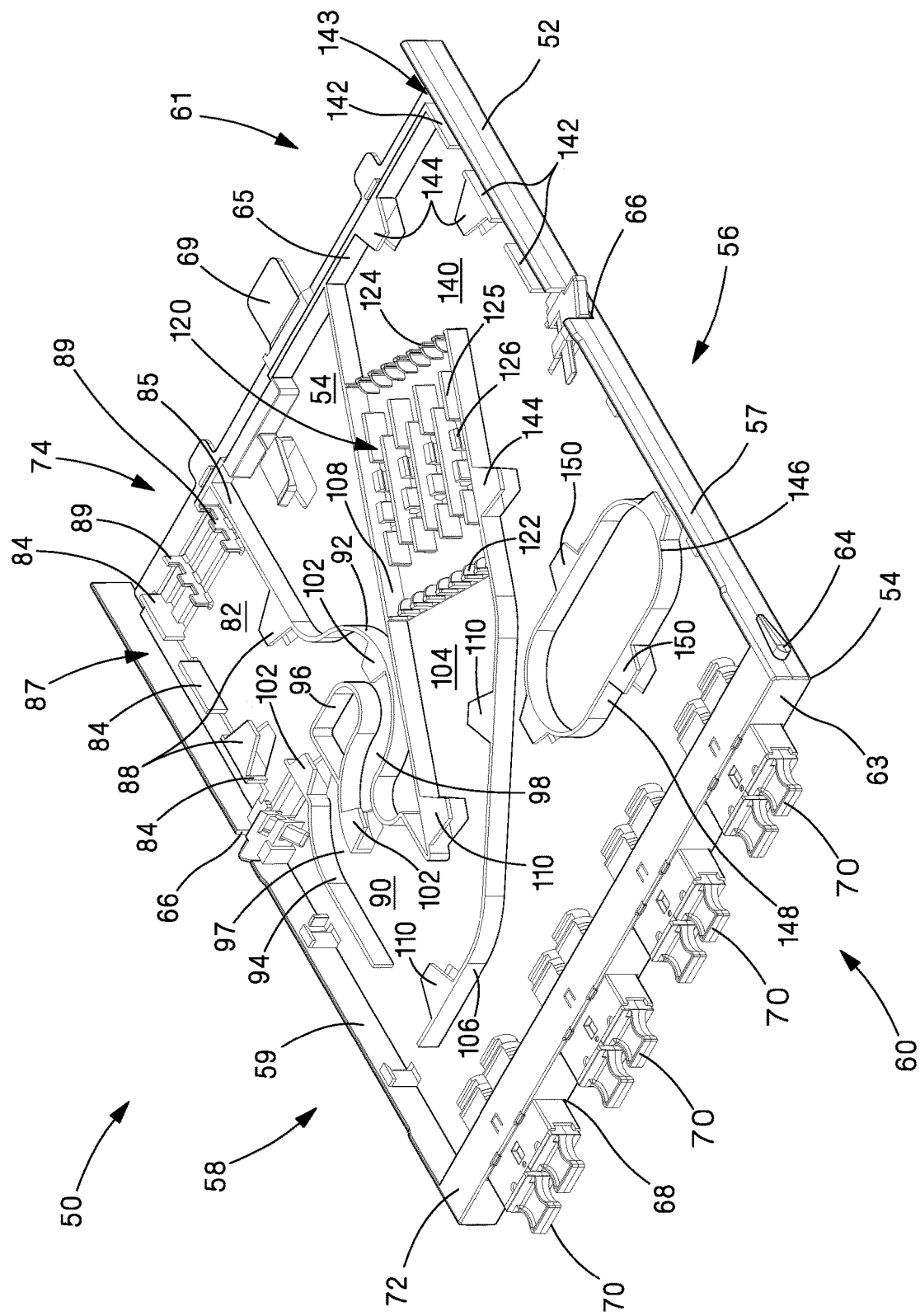
FIG. 2 depicts an isometric view of the cassette of FIG. 1, with the cover removed.

Turning now to the drawings, FIGS. 1 and 2 depict one example of a cassette 50 of the present invention. The cassette 50 includes a cassette body 52. The cassette body 52 is generally rectangularly shaped, and includes a base 54, first side 56, second side 58, front 60, and rear 61. The first side 56 includes a first side wall 57 that is attached at generally a right angle to the base 54. The second side 58 includes a second side wall 59 that is attached at generally a right angle to the base 54. The front 60 includes a front wall 63 that is attached at generally a right angle to the base 54. The rear 61 includes a rear wall 65 that is attached at generally a right angle to the base 54. The cassette 50 may also include a cassette cover 62 which extends parallel to the base 54 of the cassette body 52 from the first side wall 57 to the second side wall 59 and from the front 60 to the rear 61.

The front wall 63 is located at the front 60 of the cassette. The front wall 63 spans the width of the cassette 50, from the first side wall 57 to the second side wall 59. A front bridge 72 may be connected to the top of the front wall 63. The front bridge 72 may span the width of the cassette 50, from the first side wall 57 to the second side wall 59.

The front wall 63 includes adapter openings 68. The adapter openings 68 are configured to accept adapters 70 installed therein. As depicted in FIG. 1, the cassette 50 includes MPO adapters. The adapters 70 are configured to connect to a fiber optic cable. It is contemplated that different adapters may be utilized within the cassette 50, such as: LC-LC, MPO-MPO, SC-SC, and other fiber optic adapters.

Further depicted in FIGS. 1 and 2, the cassette 50 may have cassette front posts 64 on each of the first and second walls 56, 58. The cassette front posts 64 extend out at generally a right angle from each the first side wall 57 and second side wall 59. The cassette front posts 64 are configured to interact with a front stop latch or slots in a rail of a fiber enclosure system, as depicted in FIGS. 6-12 and described below.

The first and second side walls 57, 59 may each include a notch 66. The notch 66 may be in the shape of a rectangular cutout in the first and second side walls 57, 59. The notch 66 is configured to accommodate a cassette latch 67 extending therethrough.

The latches 67 may be found on each of the first and second sides 56, 58. The cassette latches 67 are configured to releasably connect to the cassette 50 to the fiber enclosure system as fully described below.

The cassette 50 may include a pull tab 69. The pull tab 69 may extend from the base 54 at the rear 61 of the cassette. The pull tab 69 may be integral with the base 54 or connected thereto by a fastener. A user may pull on the pull tab 69 in order to remove the cassette 50 from the fiber enclosure system.

Referring to FIG. 2, the cassette 50 is depicted with the cover 62 removed. The internal aspects of the cassette 50 are configured to accommodate ribbon fusion splicing. At the rear 61 of the cassette 50, adjacent the second side 58, is a fiber optic access 74. The fiber optic access 74 includes an access opening to the cassette 50 for the fiber optic cable to be inserted into the cassette 50. The fiber optic access 74 includes an initial splice path 82.

The initial splice path 82 is defined by track towers 84 adjacent the second side 58 and a first wall 85. The track towers 84 are rectangularly shaped, with the elongated portion being connected to the base 54 at a right angle. The track towers 84 are spaced apart from each other forming a gap between each track tower 84. The track towers 84 are offset from the second side wall 59 and run parallel thereto. A channel 87 is formed between the second side wall 59 and the track towers 84. The track tower 84 located farthest from the fiber optic access 74 may include a retention tab 88 extending from the track tower 54 at a right angle and parallel to the base 54 into the initial splice path 82. The retention tab 88 is configured to retain a portion of the fiber optic cable in the initial splice path 82.

The first wall 85 of the initial splice path 82 is offset from the track towers 84, running parallel thereto. The first wall 85 extends from the rear 61 of the cassette down the length of the initial splice path 82. The first wall 85 may also include a retention tab 88.

Located between the track towers 84 and the first wall 85, adjacent the fiber optic access 74 are two cable tie-down towers 89. The tie down towers 89 extend vertically from the base 54. The tie down towers 89 are rectangularly shaped and include notches in the upper surface to retain a band of a cable tie. The tie down towers 89 are configured to attach to a cable tie so that the fiber optic cable may be fixed to the cassette 50.

The initial splice path 82 is joined to a secondary splice path 90. The secondary splice path 90 is defined by a second wall 92 and a third wall 94. The second wall 92 is an extension of the first wall 85 of the initial splice path 82. The third wall 94 is disposed adjacent the track towers 84. A dividing wall 96 is disposed between the second wall 92 and the third wall 94. The dividing wall 96 forms a first path 97 and a second path 98 within the secondary splice path 90. The second wall 92, third wall 94, and dividing wall 96 extend vertically up from the base 54 at a right angle to the base 54.

The second wall 92, third wall 94, and dividing wall 96 may each include retention tabs 102 for retaining the fiber optic cable within the respective first path 97 or the second path 98. Fiber optic cable may be placed within the first path 97 and/or second splice path 98 to route the fiber optic cable for splicing. The secondary splice path 90 is adjoined to a third splice path 104.

The third splice path 104 is formed by a fourth wall 106 and a fifth wall 108. The fourth wall 106 is disposed adjacent the fifth wall 108. The fourth wall 106 and fifth wall 108 extend vertically up from the base 54 at a right angle. The fourth wall 106 extends generally at a diagonal from the second side 58 to adjacent the first side 56 of the cassette 50. The fifth wall 108 extends across the cassette 50 at a diagonal from the second wall 92 to the rear 61 of the cassette 50. The third splice path 104 may include retention tabs 110 disposed along the fourth wall 106 and fifth wall 108. The third splice path 104 is connected with a splice 120 for the fiber optic cable.

The splice 120 may be included at an end of the third splice path 104. The splice 120 may include entry tines 122 at an inlet of the splice 120 and exit tines 124 at an outlet of the splice 120. The entry tines 122 extend vertically from the base 54 and create a number of separate channels to rout the fiber optic cable. Located between the entry tines 122, exit tines 124 in the splice 120 are splice dividers 125 and fasteners 126.

The dividers 125 extend vertically from the base 54 and are configured to separate the fiber optic cable portions within the splice to connect with the fasteners 126. The fasteners 126 are configured to retain the fiber optic cable within the splice 120. The fasteners 126 include a concave portion on a side that engages and holds the fiber optic cable in place.

The exit of splice 120 is in communication with a fiber path 140. The fiber path 140 is defined by the rear wall 65, a second set of track towers 142, and the fourth wall 106. Retention tabs 144 may be disposed on any of the rear wall 65, track towers 142 or fourth wall 106 within the fiber path 140 and are configured as described above.

The second set of track towers 142 are rectangularly shaped, with the elongated portion being connected to the base 54 at a right angle. The second set of track towers 142 are spaced apart from each other forming a gap between each second set of track towers 142. The second set of track towers 142 are offset from the first wall 57 and run parallel thereto and define a channel 143 between the first wall 57 and the second set of track towers 142.

A slack loop 146 may reside within the fiber path 140. The slack loop 146 is oval shaped with a side wall 148 that extends vertically from the base 54. Retention tabs 150 may extend from the slack loop 146 at a right angle and parallel to the base 54 into the fiber path 140. The slack loop 146 is configured such that any additional length of fiber resulting from the splice 120 may be wound around the slack loop 146.

The fiber path 140 extends beyond the slack loop 146 to the front 60 of the cassette 50. Fiber optic cables may then be connected to the adapters 70 disposed within the front wall 63.

Figure 3:
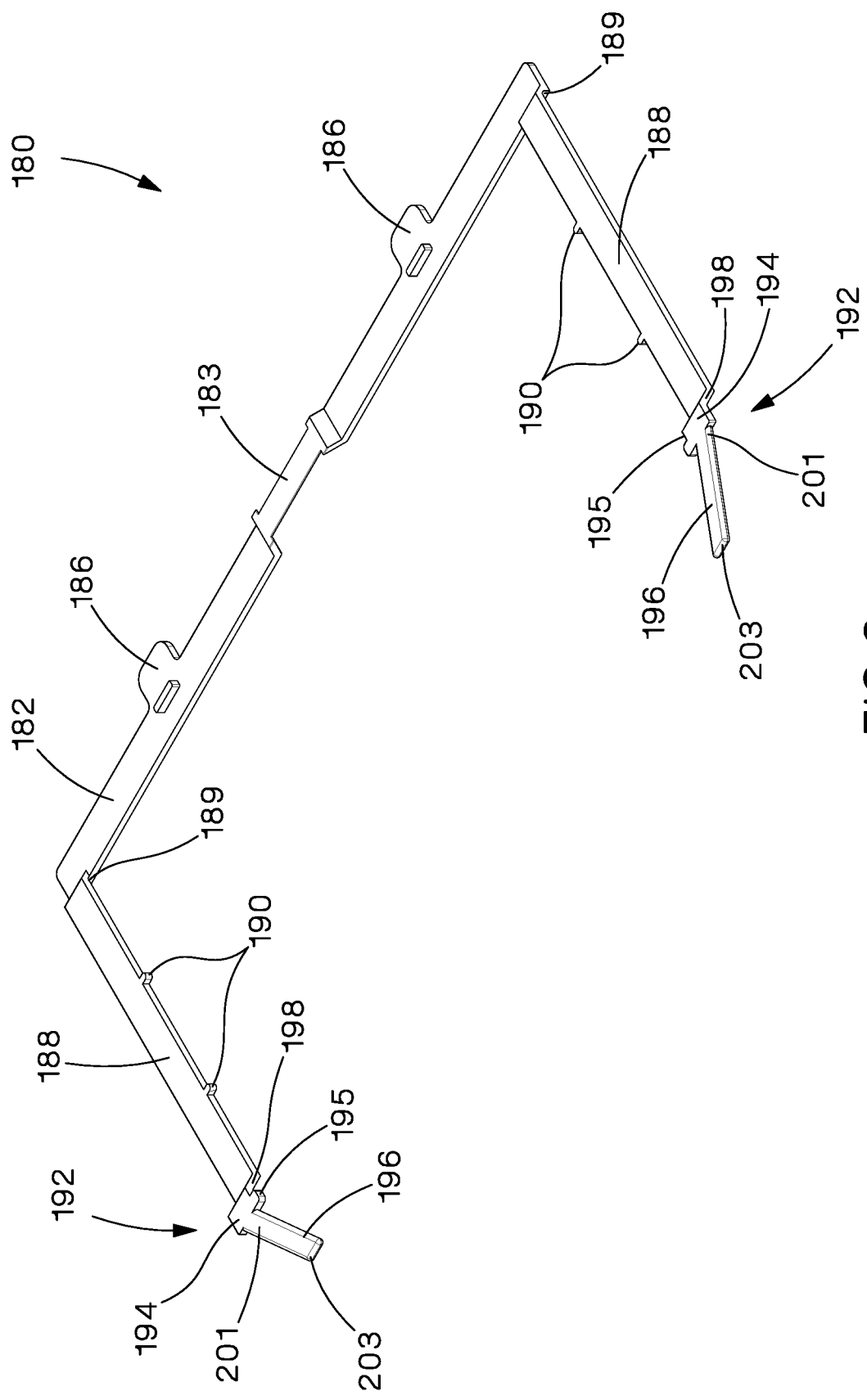
FIG. 3 depicts the cassette lock of the cassette of FIG. 2.

Depicted in FIG. 3 is an example of a cassette lock 180 of the present invention. The cassette lock 180 is configured to be disposed within the cassette 50. The cassette lock 180 includes a cross-bar 182. The cross-bar 182 is an elongated bar this is generally rectangular in shape. A bridge 183 is located in the middle of the cross-bar 182. The bridge 183 extends over the pull tab 69 of the cassette 50. Also located on the cross-bar 182, are tabs 186. The tabs 186 may be connected to the cross-bar 182 via a snap fit connection or made integral with the cross-bar 182 as depicted in FIG. 3. The tabs 186 are configured to allow a user to enact a force on the cross-bar 182 to lock or unlock the cassette 50.

Disposed on each longitudinal end of the cross-bar 182 are extensions 188. The extensions 188 include a first end connected to the cross-bar 182. The first end of the extensions 188 may be connected to the cross-bar 182 on the top surface of the cross-bar 182. As depicted in FIG. 3, the first end of the extensions 188 include a first offset 189. The first offset 189 disposes the extension 188 above the top surface of the cross-bar 182. In this example, the offset configuration of the extensions 188 elevate the extensions 188 to rest flat on the base 54.

The extensions 188 may include stops 190. The stops 190 reside along a first side of the extensions 188. The stops 190 are configured to interact with the track towers 84 to limit the motion of the extension 188 and in turn limit the motion of the cassette lock 180.

The extensions 188 include a second end disposed on the extensions 188, opposite the first ends. The second end of the extensions 188 are connected to a retraction mechanism 192. The retraction mechanism 192 is connected to the extension 188 via a second offset 198. The second offset 198 is configured to align the retraction mechanism 192 with the latch 67 of the cassette 50.

The retraction mechanisms 192 include a base 194 and an arm 196. The base 194 is generally rectangular in shape. The base 194 may include a cutout that forms a shoulder 195. The shoulder 195 is configured to interact with the track tower 84 to also limit the motion of the cassette lock 180.

The arm 196 of the retraction mechanism 192 extends from the base 194 at an inward angle from a first end 201 connected to the base 194 to a second end 203. The angle of extension of the arm 196 may be in the range of 20 degrees to 80 degrees relative to the base 194. The angle of the arm may vary in order to increase or decrease the movement of the latch 67. The arm 196 of the retraction mechanism 192 is configured to act upon the latch 67 to lock and unlock the cassette 50 from the fiber enclosure system.

It is contemplated that the cassette lock 180 may include a biasing element that maintains the cassette lock 180 against the rear wall 61 in an engaged position unless acted on by a force.

Figure 4:
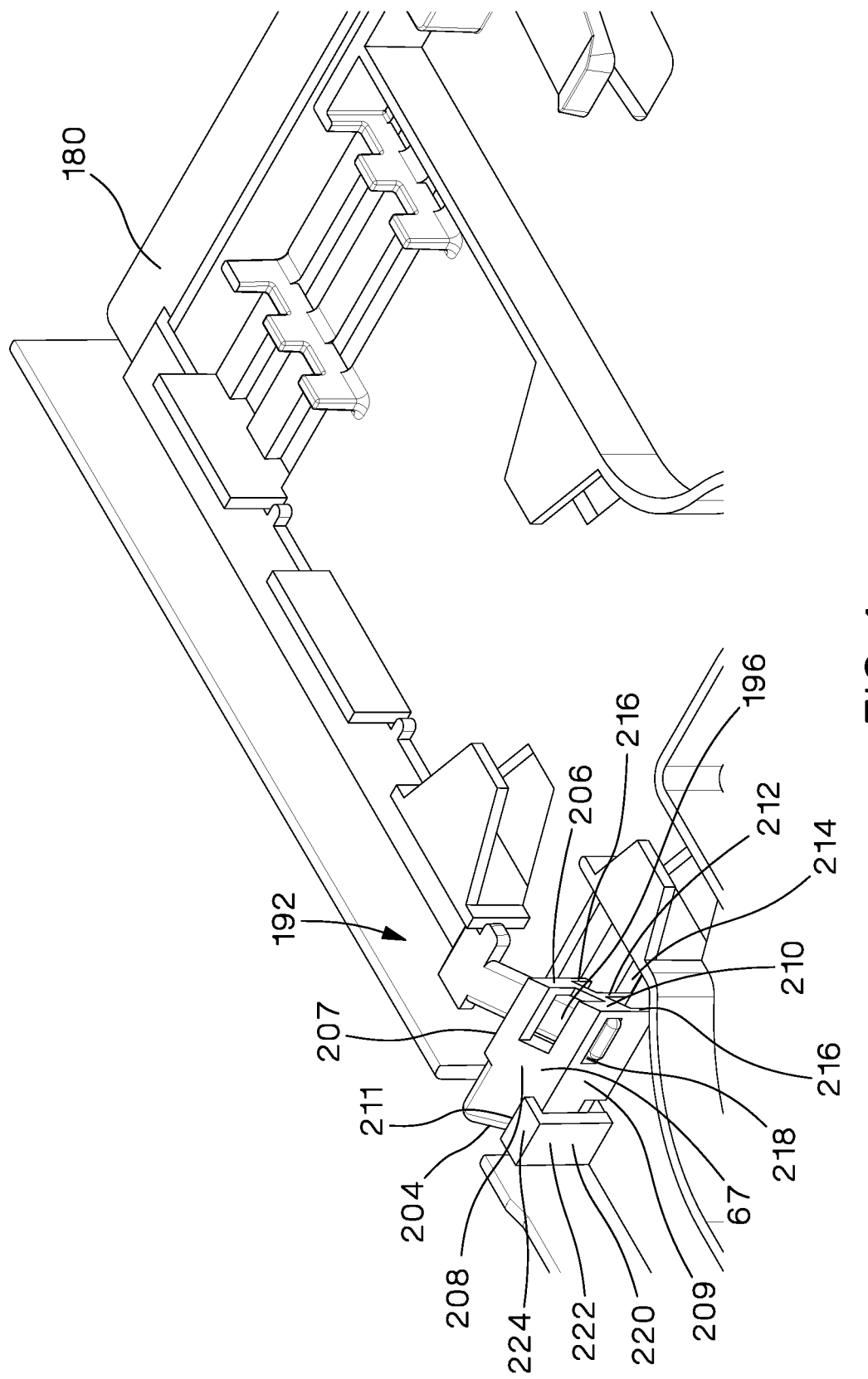
FIG. 4 depicts a close-up isometric view of a portion of the cassette lock of the cassette of FIG. 2.

FIG. 4 depicts the cassette latch 67 in communication with the retraction mechanism 192. The cassette latch includes a first end 204, second end 206, first side 207, top 208, second side 209, and bottom 210. The cassette latch 67 may be in the shape similar to an extruded parallelogram. The first end 204 may be parallel with the second end 206. The first end 204 may be angled and form a point 211 at the first end 204 and first side 207. The point 211 of the cassette latch 67 is configured to slidably engage with a rear latch retention feature of the fiber enclosure system as described below.

The bottom 210 of the cassette latch 67 includes a spline 212. The spline 212 extends vertically down from the bottom 210. The spline 212 runs at least across a portion of the bottom 210 from the second end 206 to the first end 204. The spline 212 is configured to engage within a track 214 of the base 54. The bottom 210 of the cassette latch 67 may also include rails 216. The rails 216 extend down vertically from the bottom 210. The rails 216 are configured to provide a reduced surface area of the cassette latch 67 to slide upon the base 54.

The cassette latch 67 also includes a partial bore or through opening 218. The opening 218 is located adjacent the second end 206, with the opening extending from the first side 207 to the second side 209. The opening 218 is of the same shape as the arm 196 of the retraction mechanism 192 and being slightly larger to slidably accept the arm 196 within the opening 218. It is contemplated that the latch 67 may include a biasing element that maintains the latch 67 in an engaged position unless acted on by the cassette lock 180.

The cassette latch 67 is held in place by a retainer 220. The retainer 220 includes a first element 222 and a second element 224. The first element 222 extends vertically from the base 54. The second element 224 is connected to the first element 222 at a right angle and extends parallel to the base 54. The retainer 220 encompasses the cassette latch 67 along the second side 209 and top 208. The retainer 220 is configured to maintain the cassette latch 67 in its slidable relationship with the base 54.

Figure 5:
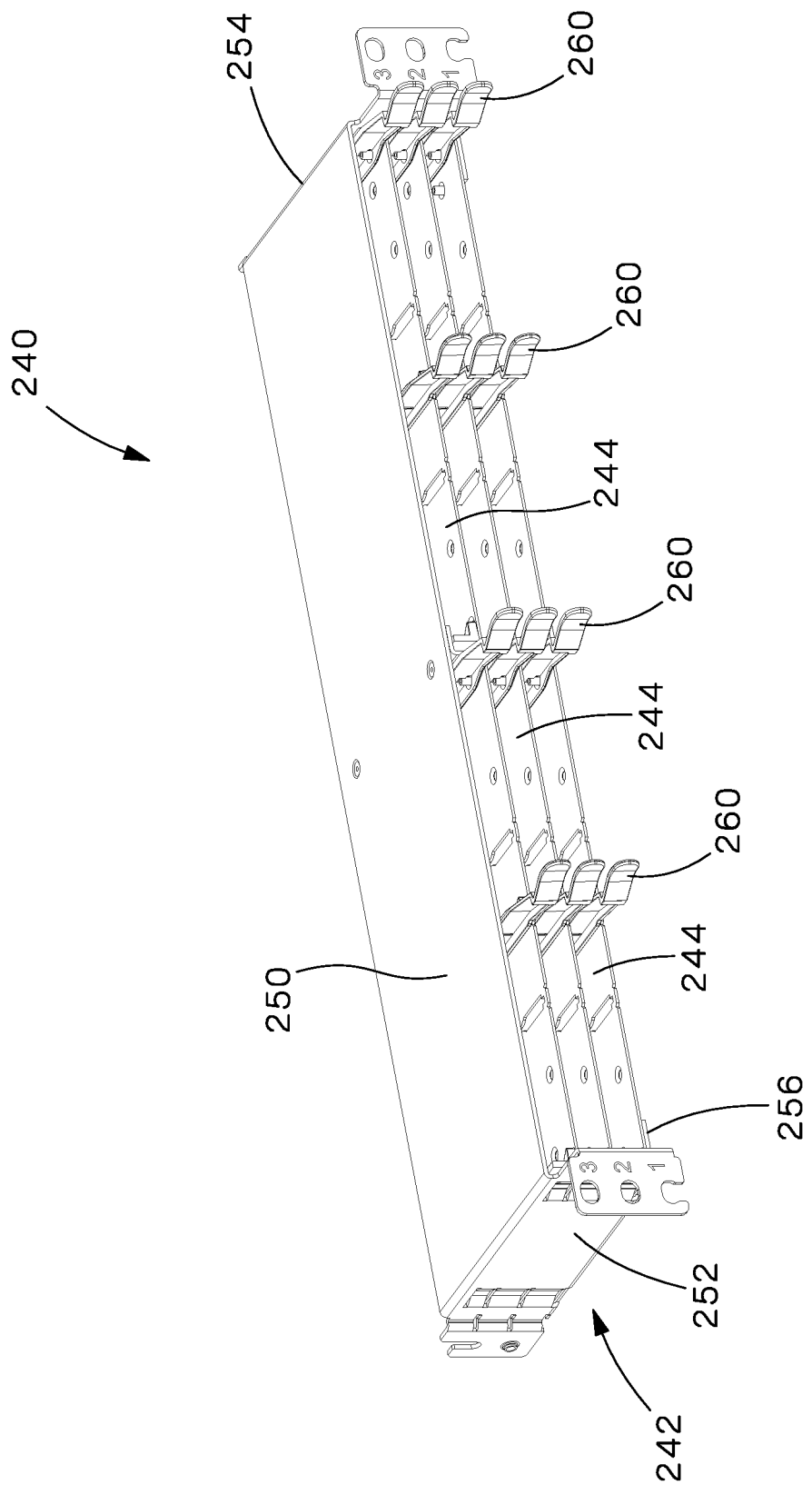
FIG. 5 depicts an isometric view of an example fiber enclosure system.

FIG. 5 depicts an example fiber enclosure system 240. The fiber enclosure system 240 may be a fiber enclosure system such as described in U.S. application Ser. No. 14/848,757 or 15/628,818, which are incorporated by reference in their entirety in this application.

The fiber enclosure system 240 consists of a frame 242 and modular trays 244. The frame 242 includes a top cover 250, right side 252, left side 254, and a bottom flange 256. The bottom flange 256 is configured to support the modular tray 244. A plurality of removable rails 260 may be added to or removed from the modular tray 244 in order to support differently-sized cassettes that support different fiber optic adapters.

Figure 6:
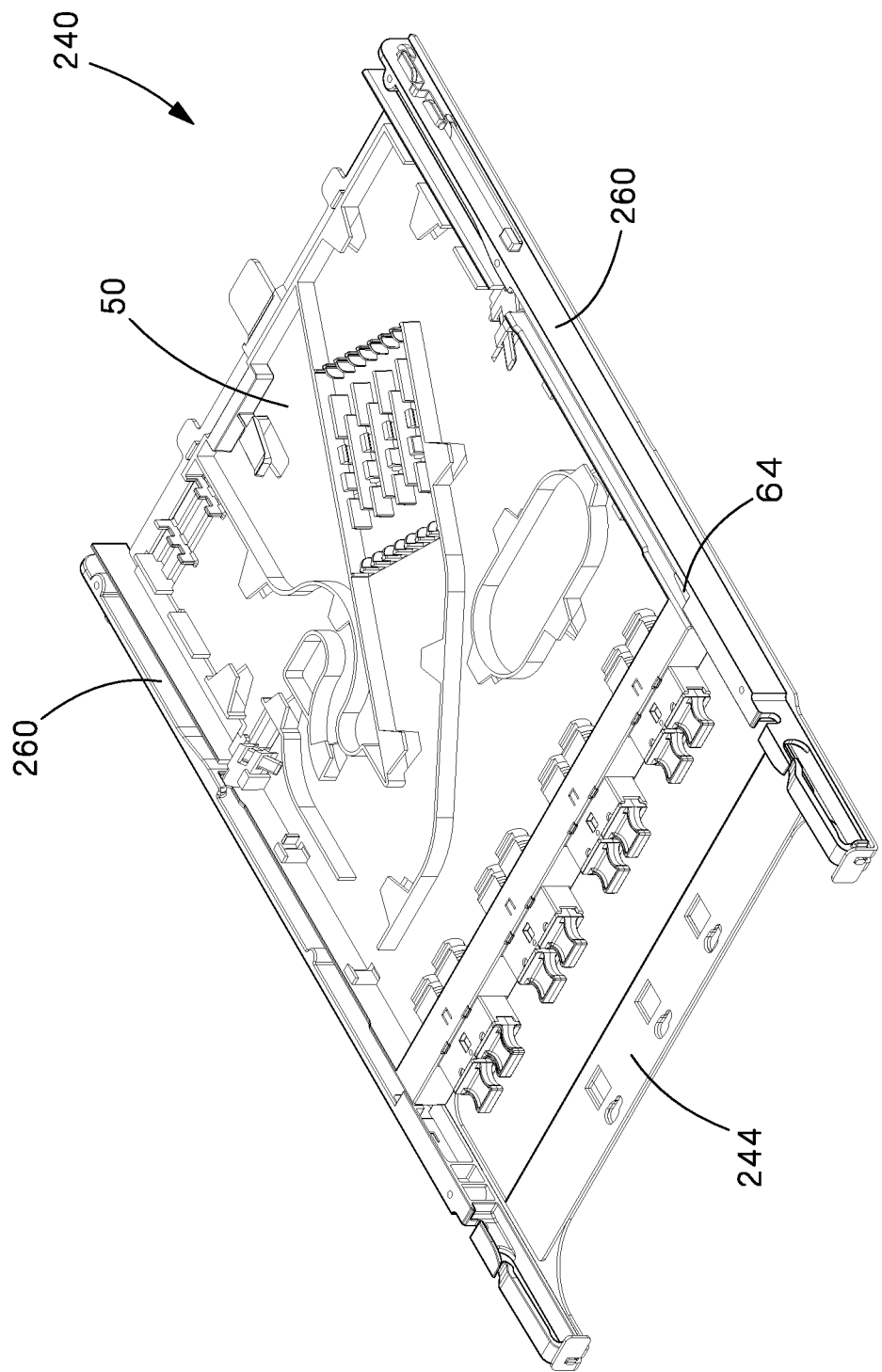
FIG. 6 depicts an isometric view of the tray of the fiber enclosure system of FIG. 5, with one cassette installed in the tray.
Figure 7:
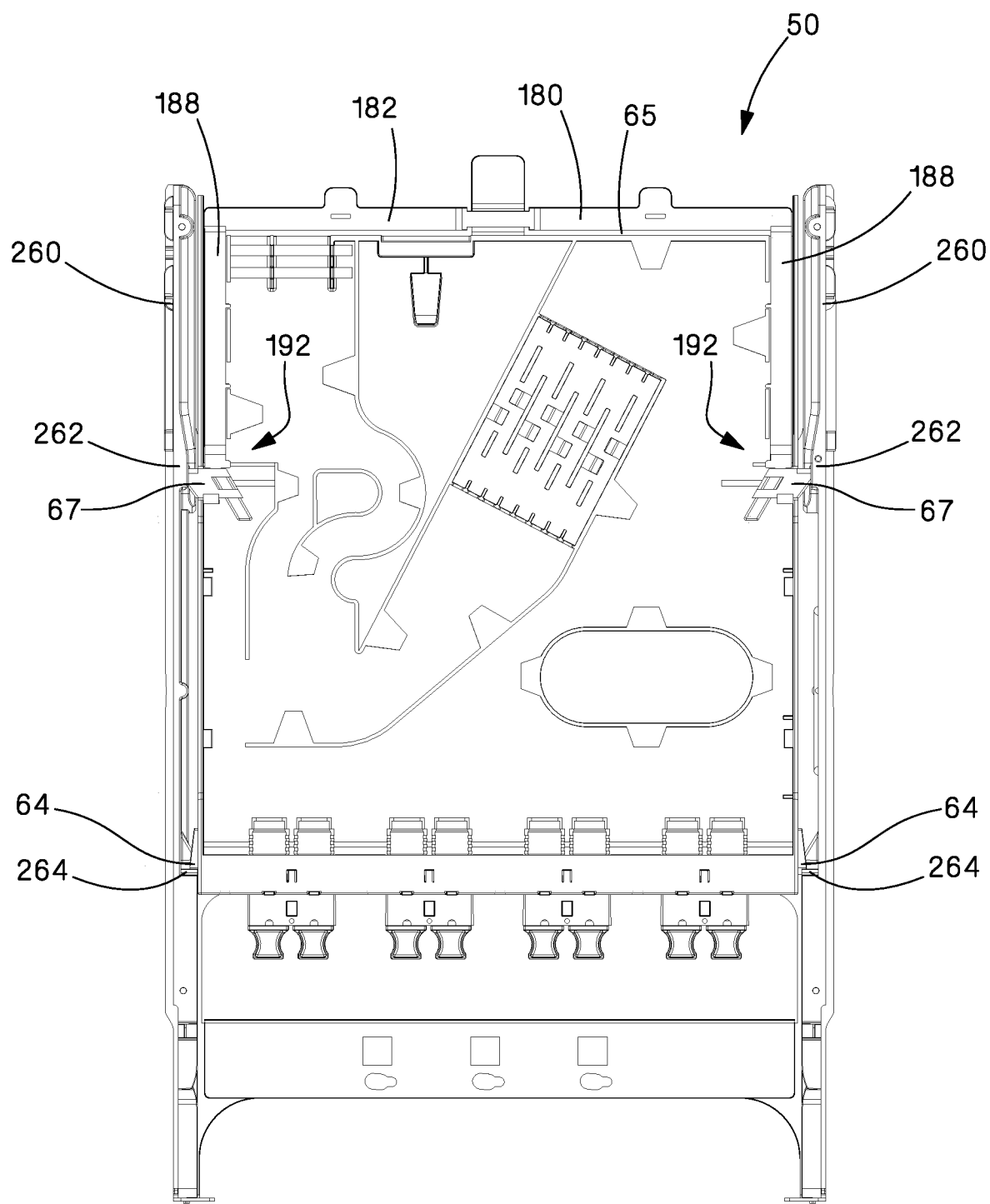
FIG. 7 depicts a top perspective of the tray of FIG. 6, with the retraction mechanism and latch in an engaged position.

FIGS. 5-6 depict an isometric view of the cassette 50 of the present invention disposed within a tray 244 of the fiber enclosure system 240. As depicted in FIG. 7, the cassette 50 is locked into position via the front posts 64 interacting with a front stop latch 264 of the rails 260 and the latch 67 locking to a rear latch retention feature 262 of the rails 260. The removable rails 260 include the rear latch retention feature 262 and the front stop latch 264. The front stop latches 264 retain the front post 64 of a cassette 50 installed therein. The rear latch retention feature 262 retains the latch 67 of a cassette installed therein.

Figure 8:
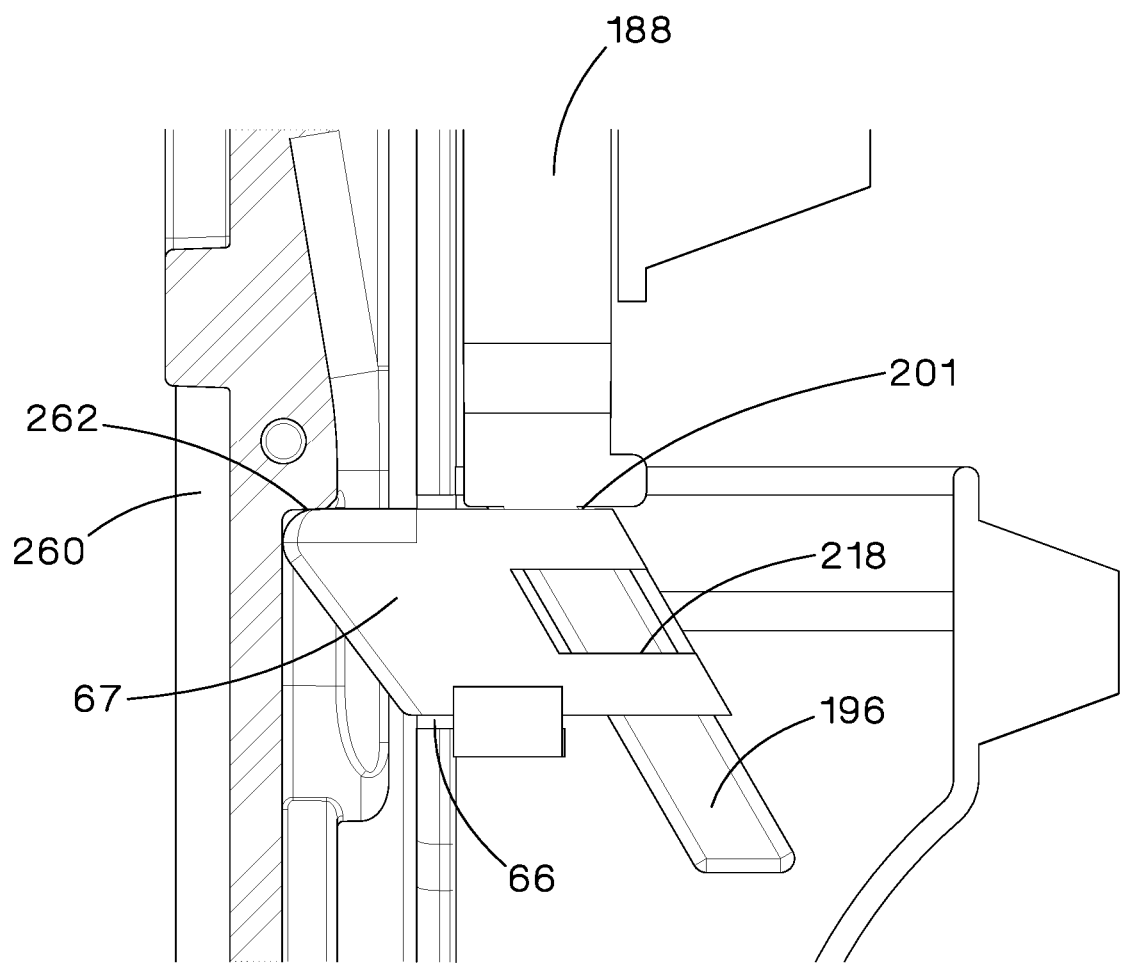
FIG. 8 depicts a close-up of the retraction mechanism and latch of FIG. 7.

FIGS. 7 and 8 depict the cassette 50 in an installed state within the rails 260 configured to be used in the example fiber optic system 240 of FIG. 5. The cassette lock 180 is installed in and connected in a locked position to the rails 260 of the example fiber optic system 240. The front posts 64 of the cassette 50 are engaged with the front stop latch 264 of the rails 260. In FIG. 7, the cassette lock 180 is in the forward position. In the forward position, the cross-bar 182 is against the rear wall 65 of the cassette 50. The extensions 188 are also in an advanced position, as is the retraction mechanism 192.

As depicted in FIG. 8, in the locked position, the first end 201 of the arm 196 abuts the cassette latch 67. In this configuration, due to the angle of the arms 196 and corresponding angle of the opening 218 of the cassette latches 67, the cassette latches 67 are each fully advanced outside the cassette 50 through the notches 66. In this position, the cassette latches 67 are engaged with the rear latch retention features 262 of the rails 260. At the cassette installed position, the cassette latches 67 are maintained inside the rails 260 with the rear latch retention feature 262 blocking rearward and upward movement of the cassette 50.

Figure 9:
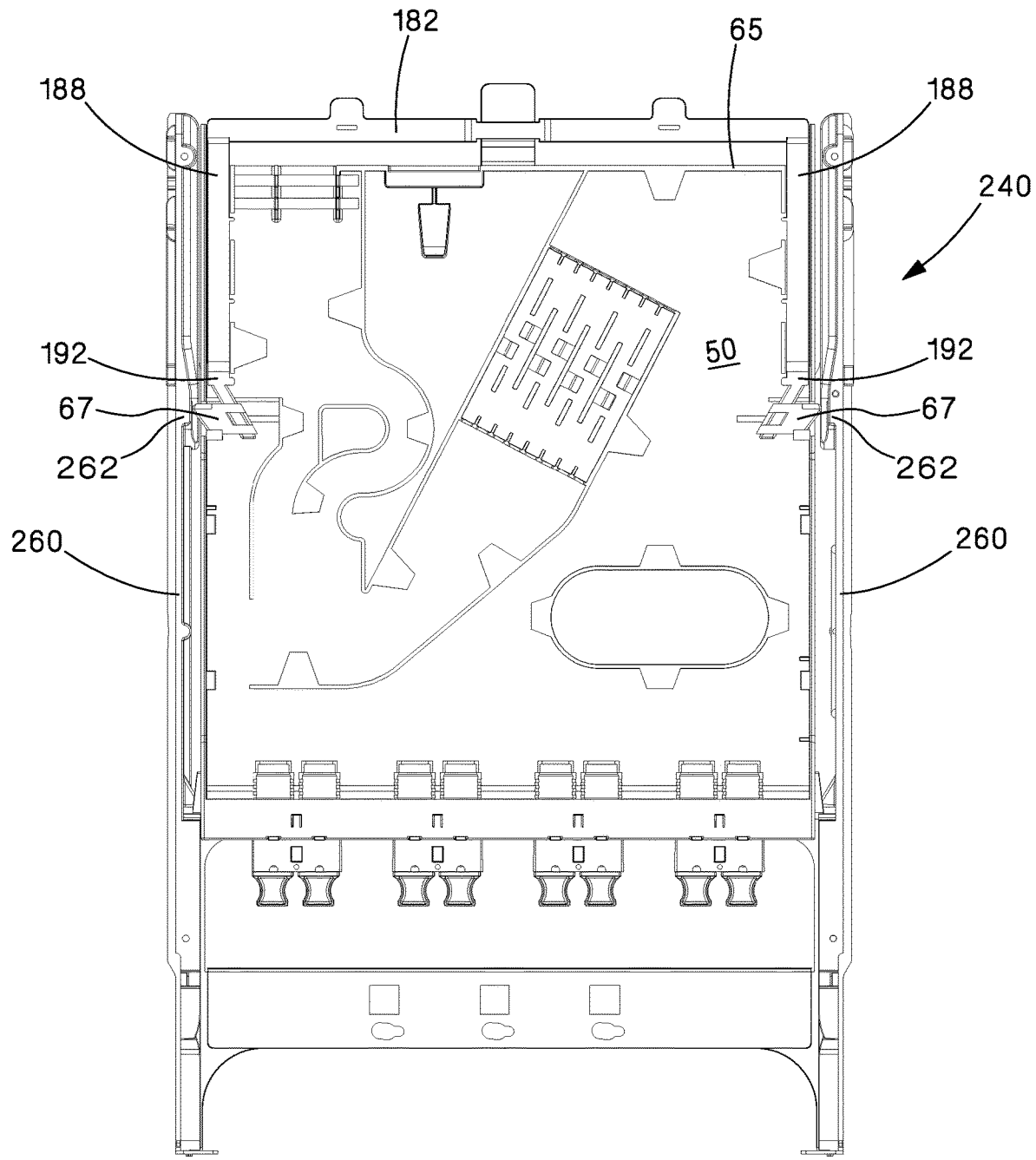
FIG. 9 depicts a top perspective of the tray of FIG. 6, with the retraction mechanism and latch in a disengaged position.
Figure 10:
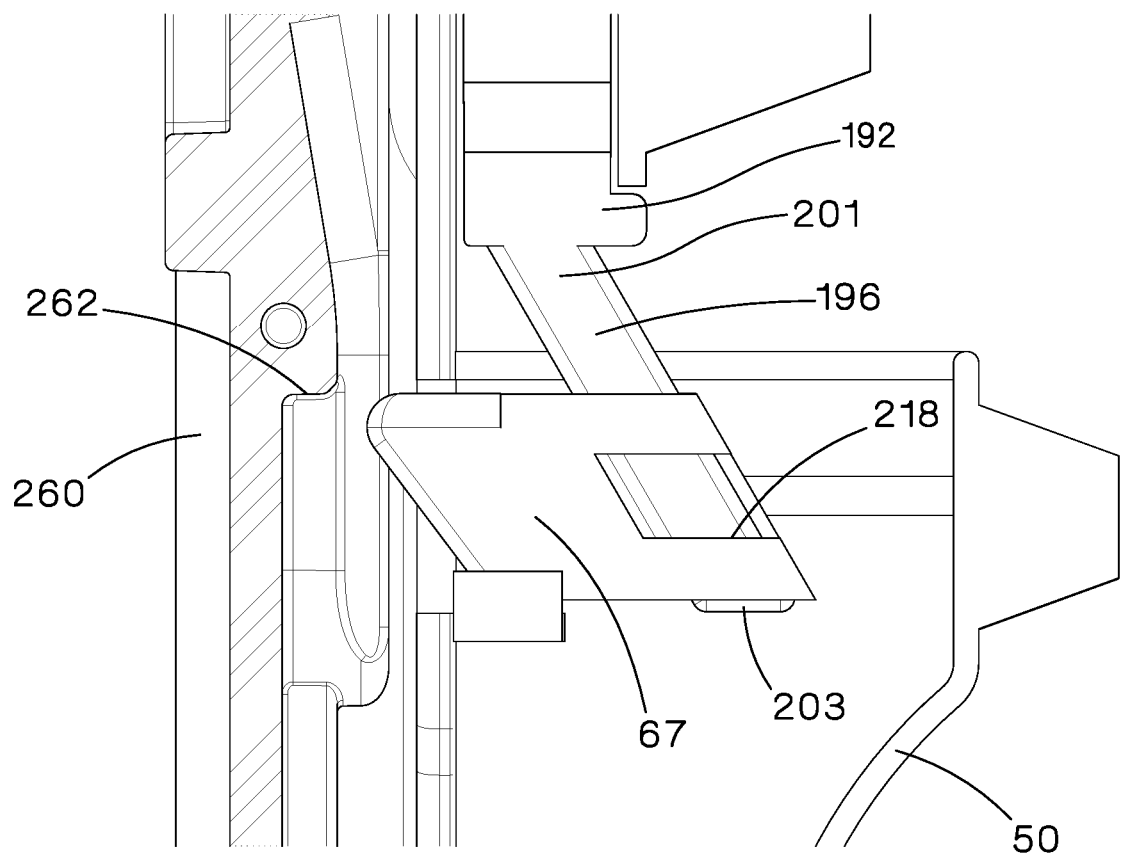
FIG. 10 depicts a close-up of the retraction mechanism and latch of FIG. 9.

FIGS. 9 and 10 depict the cassette 50 in a removable state with the fiber optic system 240. The cassette latch 67 is unlocked or disconnected with the rail rear latch retention feature 262 of the fiber optic system 240 rails 260. In FIG. 9, the cassette lock 180 is in the rearward disengaged position. In this position, the cross-bar 182 has been pulled away from the rear wall 65 of the cassette 50. The extensions 188 are in a retracted position as is the retraction mechanism 192.

As depicted in FIG. 10, in the unlocked position, the first end 201 of the arm 196 is disposed away from the cassette latch 67, where the cassette latch 67 is now disposed at the second end 203 of the arm 196. In this configuration, due to the angle of the arms 196 and corresponding angle of the opening 218 of the cassette latches 67, the cassette latches 67 are each retracted substantially inside the cassette 50. In this position, the cassette latches 67 are disengaged with the rear latch retention feature 262 of the rails 260. At the cassette uninstalled position, the cassette 50 may move rearward and upward movement from the rails 260.

In operation, when a user desires to install the cassette 50, the cassette lock 180 is placed in the unlocked position as described in the above paragraph. A user aligns the first side 56 and second side 58 of the cassette 50 with rails 260 of the tray 244. The front posts 64 of the cassette 50 may be slid along the rail 260. The cassette 50 slides forward along the rails 260 until the front posts 64 engage with the front stop latches 264 of the rails 260. When the cassette 50 is in the forward position, the latches will be adjacent to the rear latch retention features 262 of the rails 260.

A user may apply a force to the tabs 186 on cross bar 182 to cause the extensions 188 to slide forward within the channel 87 of the cassette 50. This movement causes the retraction mechanism 192 to move towards the front 60 of the cassette 50. As the arm 196 of the retraction mechanism 192 moves forward, the angle of the arm 196 slidably interacts with the angle of the opening 218 of the latch 67 causing the latch 67 to slide out of the cassette 50 along the track 214 of the cassette 50. The cassette lock 180 will slide forward until the retraction mechanism 192 has reached its full travel and locked position abutting the latch 67 and preventing further forward movement of the cassette lock 180. As the latch 67 engages and slides outside of the cassette 50, the latch 67 engages with the rear latch retention feature 262, thereby locking the cassette 50 to the rails 260. When the cassette lock 180 and latch 67 are in the locked position, the cassette 50 will be locked to the modular tray 244.

To remove the cassette 50, a user may apply an outward force on the pull tab 186 causing the cassette lock 180 to move rearward. The crossbar 182 acts on the extensions 188 to slide rearwards in the channel 87. This movement causes the retraction mechanism 192 to move towards the rear 61 of the cassette 50. As the arm 196 of the retraction mechanism 192 moves rearwards, the angle of the arm 196 slidably interacts with the angle of the opening 218 of the latch 67 causing the latch 67 to slide into the cassette 50 along the track 214 of the cassette 50. The cassette lock 180 will slide rearward until it has reached its full travel and unlocked position, where the stops 190 contact the track towers 84 and prevent further rearward movement of the cassette lock 180. As the latch 67 retracts and slides inside the cassette 50, the latch 67 disengages with the rear latch retention feature 262. When the cassette lock 180 and latch 67 are in the unlocked position, the cassette 50 may then be removed from the rear of the modular tray 244.

The illustrations of the embodiments described herein are intended to provide a general understanding of the structure of the various examples. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

What is claimed is:

1. A cassette configured for installation in a fiber enclosure system, the cassette comprising:
    a base,
    a first side wall including a first side opening;
    a second side wall including a second side opening, the second side wall being opposite the first side wall;
    a front wall with an opening including an adapter configured to connect to at least one fiber optic cable;
    a latch including a pass-through opening, the latch configured to extend through the first side opening of the first side wall and releasably connect the cassette to a rail included in the fiber enclosure system; and
    a lock located within an inner housing of the cassette defined, at least in part, by the base, the first side wall, the second side wall, and the front wall, wherein the lock is configured to actuate the latch into an unlocked position and actuate the latch into a locked position, wherein the lock includes an arm portion configured to fit through the pass-through opening of the latch.

2. The cassette of claim 1, wherein the arm portion is angled with respect to the first side wall.

3. The cassette of claim 1, wherein the pass-through opening is configured to slidably house the arm portion of the lock when the lock is being actuated to the unlocked position or the locked position.

4. The cassette of claim 1, wherein the pass-through opening of the latch is disposed within the latch at an angle in a range of 20 degrees to 80 degrees inwards towards a center of the cassette relative to the first side wall.

5. The cassette of claim 1, wherein the arm is disposed at an angle in a range of 20 degrees to 80 degrees inwards towards a center of the cassette relative to the first wall.

6. The cassette of claim 1, wherein the latch is comprised of a first portion configured to extend through the first side opening of the first side wall and a second portion including the pass-through opening, wherein the second portion is configured to remain within a housing of the cassette.

7. The cassette of claim 6, wherein the first portion includes a stopping edge portion configured to abut against a locking feature included in a tray when the cassette is installed into the tray and in the locked position.

8. The cassette of claim 6, wherein the second portion includes a releasing angled portion configured to enable release from a locking feature included in a tray when the cassette is installed into the tray and the lock is actuating into the unlocked position.

9. The cassette of claim 1, further comprising:
    an opposite latch positioned to extend through the second side opening of the second side wall and configured to releasably connect the cassette to a second rail included in the fiber enclosure system.

10. A fiber enclosure system comprising:
    a frame;
    a tray;
    a rail configured to slidably accept the tray, the rail including a latch retention feature; and
    a cassette configured to be installed into the tray, the cassette comprising:
        a base,
        a first side wall including a first side opening;
        a second side wall including a second side opening, the second side wall being opposite the first side wall;
        a front wall with an opening including an adapter configured to connect to at least one fiber optic cable;
        a latch including a pass-through opening, the latch configured to extend through the first side opening of the first side wall and releasably connect the cassette to the latch retention feature of the rail; and a lock located within an inner housing of the cassette defined, at least in part, by the base, the first side wall, the second side wall, and the front wall, wherein the lock is configured to actuate the latch into an unlocked position and actuate the latch into a locked position, wherein the lock includes an arm portion configured to fit through the pass-through opening of the latch.

11. The fiber enclosure system of claim 10, wherein the arm portion is angled with respect to the first side wall.

12. The fiber enclosure system of claim 10, wherein the pass-through opening is configured to slidably house the arm portion of the lock when the lock is being actuated to the unlocked position or the locked position.

13. The fiber enclosure system of claim 10, wherein the pass-through opening of the latch is disposed within the latch at an angle in a range of 20 degrees to 80 degrees inwards towards a center of the cassette relative to the first side wall.

14. The fiber enclosure system of claim 10, wherein the arm is disposed at an angle in a range of 20 degrees to 80 degrees inwards towards a center of the cassette relative to the first wall.

15. The fiber enclosure system of claim 10, wherein the latch is comprised of a first portion configured to extend through the first side opening of the first side wall and a second portion including the pass-through opening, wherein the second portion is configured to remain within a housing of the cassette.

16. The fiber enclosure system of claim 15, wherein the first portion includes a stopping edge portion configured to abut against a locking feature included in the tray when the cassette is installed into the tray and in the locked position.

17. The fiber enclosure system of claim 15, wherein the second portion includes a releasing angled portion configured to enable release from a locking feature included in the tray when the cassette is installed into the tray and the lock is actuating into the unlocked position.

18. The fiber enclosure system of claim 10, further comprising:

a second rail configured to slidably accept the tray, the second rail including a second latch retention feature; and an opposite latch positioned to extend through the second side opening of the second side wall and configured to releasably connect the cassette to a second latch retention feature included in the second rail.

* * * * *